No. 830,409. PATENTED SEPT. 4, 1906.
H. L. BRYANT.
TROLLEY.
APPLICATION FILED OCT. 31, 1905.
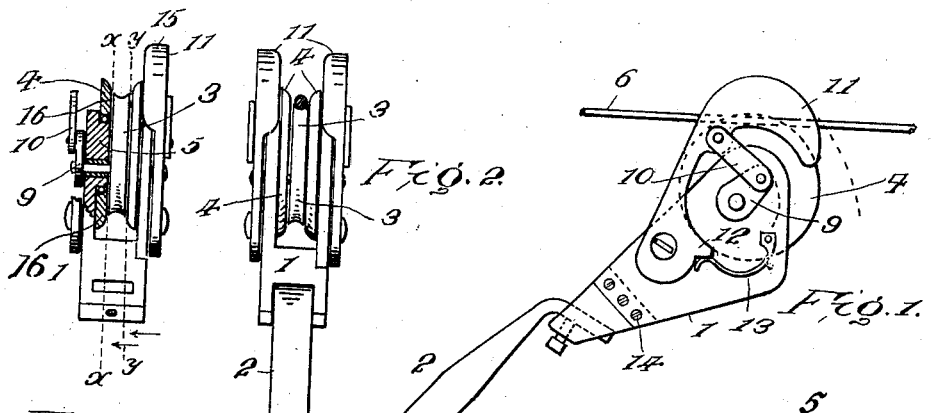
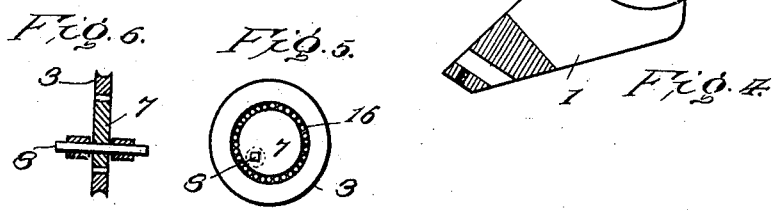
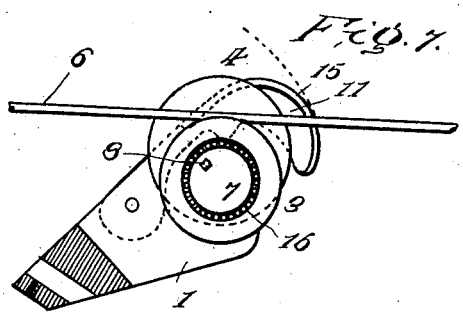
Witnesses
Inventor
Herschel L. Bryant,
By
Lacey, Attorneys.

UNITED STATES PATENT OFFICE.

HERSCHEL L. BRYANT, OF TONKAWA, OKLAHOMA TERRITORY.

TROLLEY.

No. 830,409.　　　Specification of Letters Patent.　　　Patented Sept. 4, 1906.

Application filed October 31, 1905. Serial No. 285,313.

*To all whom it may concern:*

Be it known that I, HERSCHEL L. BRYANT, a citizen of the United States, residing at Tonkawa, in the county of Kay and Territory of Oklahoma, have invented certain new and useful Improvements in Trolleys, of which the following is a specification.

This invention relates to improvements in trolleys, and has for its object to provide a device of this character which is so constructed as to accomplish the double result of preventing the trolley from jumping or becoming disengaged from the feed-wire and also of always insuring a close contact between the tread portion of the trolley-wheel and the line-wire.

With this object in view the invention consists, essentially, of a trolley-wheel having an adjustable tread portion, guard-arms to prevent the trolley from leaving the wire, and means for causing the guard-arms and adjustable tread portion of the wheel to move toward the feed-wire should there be a tendency for the trolley and wire to separate.

For a full description of the invention and the merits thereof and also to acquire a knowledge of the details of construction of the means for effecting the result reference is to be had to the following description and accompanying drawings, in which—

Figure 1 is a side view of a trolley embodying my invention. Fig. 2 is a front view of the same. Fig. 3 is a similar view with parts broken away to show the method of mounting the guide-flanges. Fig. 4 is a vertical sectional view on the line $xx$ of Fig. 3 looking in the direction of the arrow and shows the manner in which the guard-flanges are mounted. Fig. 5 is a side view of the tread portion and the eccentric upon which it is mounted. Fig. 6 is a transverse sectional view through the same. Fig. 7 is a vertical sectional view upon the line $yy$ of Fig. 3 looking in the direction of the arrow and shows the tread portion of the wheel in a lowered position with relation to the guide-flanges.

Corresponding and like parts are referred to in the following description and indicated in all the views of the drawings by the same reference characters.

The numeral 1 designates the harp or frame, which is removably connected to the trolley-staff 2 and has its outer end forked or bifurcated to form arms, between which the trolley-wheel 3 and the guide-flanges 4 are mounted. The guide-flanges 4 comprise annular rings having their edges beveled inward toward the tread portion 3 of the wheel and are journaled upon circular seats 5, projecting inward from the arms of the forked end of the frame 1. The trolley-wheel or tread portion 3 has a grooved periphery for engagement with the feed-wire 6 and is mounted upon a circular disk 7, which is eccentrically connected to a shaft 8. The extremities of the shaft 8 project slightly beyond the frame or harp 1 and are provided with crank-arms 9. These crank-arms 9 are connected, by means of links 10, to the guard-arms 11, which are pivoted upon opposite sides of the frame 1 and project beyond the guide-flanges 4 to prevent the trolley from jumping or becoming disengaged from the feed-wire. The lower portions of the guard-arms 11 are provided with a rearwardly-projecting lug 12, which is engaged by the free end of a spring 13. When in normal position, the guard-arms 11 are inclined toward the rear, as best seen in Fig. 7; but should the feed-wire become separated from and cease to exert a downward pressure upon the trolley-wheel 3 the spring 13 will throw the guard-arms 11 upward toward a vertical position and in so doing will cause their outer ends to project farther beyond the guide-flanges 4 and render it very difficult for the wire and trolley to become entirely separated. This result is due to the fact that the eccentric upon which the trolley-wheel 3 is mounted and the guard-arms 11 are connected by the links 10, and it will be apparent that this construction insures a simultaneous movement of the two members.

In the operation of the device it will be readily understood that any tendency of the feed-wire and trolley to separate owing to their opposite vibrations will be counteracted by the vertical movement of the guard-arms and the tread portion of the wheel. Attention may also be called to the fact that one of the arms of the forked end of the frame 1 is made removable and is normally held in place by screws 14 or other suitable fastening means. This enables the device to be readily taken apart should same become necessary for the purpose of cleaning or repairing.

In the practical application of the device it may be found desirable to employ ball-bearings 16 in connection with the trolley-wheel and guide-flanges, since by this means the friction will be greatly reduced and a smooth and even rotary movement of the wheels will be obtained. It will also be observed that the outer ends of the guard-arms are rounded and provided with inwardly-projecting flanges 15. These flanges serve the double function of a reinforcing agent and of providing a broad bearing-surface which prevents injury to the hangers by which the feed-wire is suspended.

Having thus described the invention, what is claimed as new is—

1. In a trolley, the combination of a frame, a shaft journaled in the frame, a disk eccentrically mounted upon the shaft, a trolley-wheel loosely mounted upon the disk, and means whereby the shaft is automatically turned to throw the trolley-wheel outwardly when the latter has a tendency to leave the wire.

2. In a trolley, the combination of a frame, a shaft journaled in the frame, a disk eccentrically mounted upon the shaft, a trolley-wheel loosely mounted upon the disk, a crank-arm for turning the shaft and eccentrically-mounted disk, and means for automatically operating the crank-arm to turn the eccentric member and throw the trolley-wheel outwardly when the latter has a tendency to leave the wire.

3. In a trolley, the combination of a frame, a shaft journaled in the frame, a disk eccentrically mounted upon the shaft, a trolley-wheel loosely mounted upon the disk, a crank-arm for operating the shaft and the eccentrically-mounted disk, guard-arms pivotally connected to the frame and extending outwardly beyond the trolley-wheel, and connecting means between the guard-arms and crank-arm whereby the trolley-wheel and guard-arms have a simultaneous movement.

4. In a trolley the combination of a frame having a forked end, raised seats projecting inward from the arms of the forked end, a trolley-wheel mounted in the forked end, and guide-flanges journaled upon the beforementioned raised seats.

5. In a trolley the combination of a frame having a forked end, raised seats projecting inward from the arms of the forked end, a trolley-wheel mounted in the forked end, guide-flanges journaled upon the before-mentioned raised seats, and means whereby the trolley-wheel can be moved back and forth independently of the guide-flanges.

6. In a trolley the combination of a frame, a shaft journaled in the frame, an eccentric member connected to the shaft, a trolley-wheel mounted upon the eccentric member, separate guide-flanges mounted upon opposite sides of the trolley-wheel, guard-arms pivotally connected to the frame, and means for securing a simultaneous movement of the trolley-wheel and the guard-arms.

7. In a trolley the combination of a frame having a forked end, raised seats projecting inwardly from the arms at the forked end of the frame, an eccentric member mounted between said arms, a trolley-wheel mounted upon said eccentric member, separate guide-flanges mounted upon the before-mentioned raised seats, said trolley-wheel being movable back and forth independently of the guide-flanges, guard-arms pivotally connected to the frame, and means for securing a simultaneous movement of the guard-arms and the trolley-wheel.

8. In a trolley the combination of a frame having a forked end, a shaft passing through the arms of the forked end, a disk connected eccentrically to the shaft, a trolley-wheel mounted upon the disk, a crank-arm connected to the end of the shaft, guard-arms pivotally connected to the frame, a link member connecting the crank-arm and the guard-arms, and a spring tending to throw the guard-arms outward.

In testimony whereof I affix my signature in presence of two witnesses.

HERSCHEL L. BRYANT. [L. S.]

Witnesses:
U. G. CHARLES,
A. J. ADAMS.